(12) United States Patent
Kozik

(10) Patent No.: US 6,308,729 B2
(45) Date of Patent: Oct. 30, 2001

(54) FILLING VALVE FOR A PRESSURIZED FLUID CONTAINER

(75) Inventor: Meir Kozik, Herzliya (IL)

(73) Assignee: K.C. Technologies Ltd., Tel Aviv (IL)

( * ) Notice: Subject to any disclaimer, the term of this patent is extended or adjusted under 35 U.S.C. 154(b) by 0 days.

(21) Appl. No.: 09/733,504

(22) Filed: Dec. 8, 2000

Related U.S. Application Data

(63) Continuation-in-part of application No. 09/490,136, filed on Jan. 24, 2000, which is a continuation of application No. 09/148,578, filed on Sep. 4, 1998, now Pat. No. 6,026,841.

(30) Foreign Application Priority Data

Sep. 8, 1997 (IL) ........................................ 121723
Jul. 19, 1998 (IL) ........................................ 125499

(51) Int. Cl.[7] ............... F16K 31/26; F16K 31/52; F16K 51/00
(52) U.S. Cl. ............... 137/446; 137/422; 137/442; 141/198
(58) Field of Search .................. 137/422, 434, 137/442, 443, 444, 446; 141/198

(56) References Cited

U.S. PATENT DOCUMENTS

| 582,911 | * | 5/1897 | Frederick | 137/446 |
|---|---|---|---|---|
| 1,266,637 | * | 5/1918 | Snyder | 137/442 |
| 1,983,061 | * | 12/1934 | Ambroz et al. | 137/444 |
| 2,504,638 | * | 4/1950 | Browning | 137/446 |
| 2,550,313 | * | 4/1951 | Tucker | 137/422 |
| 3,324,878 | * | 6/1967 | Dill | 137/443 |
| 3,756,269 | * | 9/1973 | Brown | 137/446 |
| 4,064,907 | * | 12/1977 | Billington et al. | 137/446 |
| 4,177,829 | * | 12/1979 | Friedman | 137/446 |
| 4,483,367 | * | 11/1984 | Ross, Jr. et al. | 141/198 |
| 4,541,464 | * | 9/1985 | Christiansen | 137/446 |
| 5,072,751 | * | 12/1991 | Lin | 137/442 |

* cited by examiner

Primary Examiner—George L. Walton
(74) Attorney, Agent, or Firm—Abelman, Frayne & Schwab

(57) ABSTRACT

A filling valve for a pressurized fluid container, including a tube with a longitudinal bore and a side port formed therein, a piston slidingly disposed in the tube, the piston being formed with a bore therethrough, a valve lever pivotally attached to a portion of the tube, the piston including a jutting portion which protrudes in a direction generally away from a bottom portion of the tube, a float arm attached to the valve lever, and a float mounted on the float arm, wherein when the float is positioned at a generally obtuse angle with respect to a longitudinal axis of the tube, the jutting portion of the piston is raised and supported by the valve lever, such that the piston is raised and does not block the side port, thereby permitting fluid flow through the side port, and wherein when the float is sufficiently buoyed by a fluid, the float arm swings upwards and the jutting portion of the piston is no longer supported by the valve lever and the piston moves downwards and blocks the side port, thereby preventing fluid flow through the side port.

8 Claims, 5 Drawing Sheets

FILLING VALVE FOR A PRESSURIZED FLUID CONTAINER

This appln is a C-I-P of Ser. No. 09/490,136 filed Jan. 24, 2000 and a con't of Ser. No. 09/148,578 filed Sep. 4, 1998, U.S. Pat. No. 6,026,841.

FIELD OF THE INVENTION

The present invention relates to filling apparatus for a pressurized fluid container, and particularly to a novel filling valve which achieves a faster filling rate of pressurized fluid containers with significantly reduced turbulence.

BACKGROUND OF THE INVENTION

Pressurized fluid containers, such as pressurized LPG containers, are typically filled by transferring therein a fluid at high pressure from a pressurized fluid source, such as a tanker truck. The container is generally designed in the art such that when it has been filled to approximately 80% of its total volume, fluid begins to escape through a relief valve, thereby signaling that the container has been adequately filled and that the filling operation should be terminated.

Some municipal codes forbid allowing fluid, such as LPG, from escaping to the environment to signal the end of the filling process. Therefore, it is desirable to provide apparatus and methods for filling pressurized fluid containers without any fluid escaping to the environment.

U.S. Pat. No. 6,026,841 to Kozik, the disclosure of which is incorporated herein by reference, provides improved apparatus and methods for filling pressurized fluid containers without any fluid escaping to the environment. The pressurized fluid apparatus of U.S. Pat. No. 6,026,841 includes a pressurized fluid container, a pipe arranged for flow therethrough of the pressurized fluid into the container, a valve operatively connected to an end of the pipe disposed in the container, and a float attached to the valve. The float is insertable through an upper opening of the container.

The float is buoyed generally upwards by the pressurized fluid filling the container, such that when the float has been moved a predetermined amount, the float closes the valve and substantially stops flow of the pressurized fluid into the container. The valve is rotatably attached to the pipe and is closed by an angular upward movement of the float. The valve includes a tube with a longitudinal bore having a longitudinal axis formed therein, and a piston is slidingly disposed in the tube. When the float is generally perpendicular to the longitudinal axis, the piston sealingly abuts an internal end face of the tube, thereby closing the valve.

U.S. Pat. No. 6,026,841 further provides a bypass passageway such that a fluid, such as LPG vapor, can be conducted through the bypass passageway even during filling of the container. In this way, a consumer can constantly use the fluid, such as for home cooking, without interruption, even during filling of container.

SUMMARY OF THE INVENTION

The present invention seeks to provide further improvements to U.S. Pat. No. 6,026,841. In U.S. Pat. No. 6,026,841, the pressurized fluid exits from the bottom of the valve into the pressurized fluid container. In the present invention, the pressurized fluid exits from a relatively large side port formed in the valve. The lateral exit of the pressurized fluid provides two surprising advantages. First, a significantly greater flow rate of pressurized fluid passes through the valve, meaning that the pressurized fluid container is filled faster than before. Second, the lateral exit of the pressurized fluid has significantly less turbulence than the bottom exit of U.S. Pat. No. 6,026,841. Thus, in the present invention, a faster filling rate is achieved with significantly reduced turbulence.

Another improvement of the present invention is concerned with release of the valve when the float arm starts to move downwards. The float arm is connected to a lever of the valve. When the level of the pressurized fluid goes down inside the container, the float arm swings downwards. At the moment the float arm swings downwards, the piston of the valve is supposed to move upwards, generally by means of a spring urging the piston upwards. However, if the float arm were to be rigidly connected to the valve lever, the valve lever could possibly interfere with the upward movement of the valve piston.

In the present invention, the float arm is connected to a lever of the valve in such a way that the float arm can rotate slightly with respect to the valve lever without causing any motion of the lever. This means that the float arm can descend a small amount before actuating the valve. The delay in actuating the valve permits the piston of the valve to move upwards without any interference from the valve lever.

There is thus provided in accordance with a preferred embodiment of the present invention a filling valve for a pressurized fluid container, including a tube with a longitudinal bore and a side port formed therein, a piston slidingly disposed in the tube, the piston being formed with a bore therethrough, a valve lever pivotally attached to a portion of the tube, the piston including a jutting portion which protrudes in a direction generally away from a bottom portion of the tube, a float arm attached to the valve lever, and a float mounted on the float arm, wherein when the float is positioned at a generally obtuse angle with respect to a longitudinal axis of the tube, the jutting portion of the piston is raised and supported by the valve lever, such that the piston is raised and does not block the side port, thereby permitting fluid flow through the side port, and wherein when the float is sufficiently buoyed by a fluid, the float arm swings upwards and the jutting portion of the piston is no longer supported by the valve lever and the piston moves downwards and blocks the side port, thereby preventing fluid flow through the side port. The side port is preferably located on a side of the tube opposite to the float and float arm.

In accordance with a preferred embodiment of the present invention the jutting portion includes an elongate pin fixedly attached to the piston.

Further in accordance with a preferred embodiment of the present invention the piston is biased by a biasing device, which applies a force against the piston in a direction generally towards an upper portion of the tube.

Still further in accordance with a preferred embodiment of the present invention an upper end of the bore of the piston is larger in diameter than a lower end thereof.

Additionally in accordance with a preferred embodiment of the present invention the float arm is pivotally attached to the valve lever.

In accordance with a preferred embodiment of the present invention the float arm and the valve lever are configured such that there is a clearance between an internal perimeter of the float arm and the valve lever, wherein because of the clearance, the float arm is rotatable through an angle with respect to the valve lever without causing motion of the valve lever.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
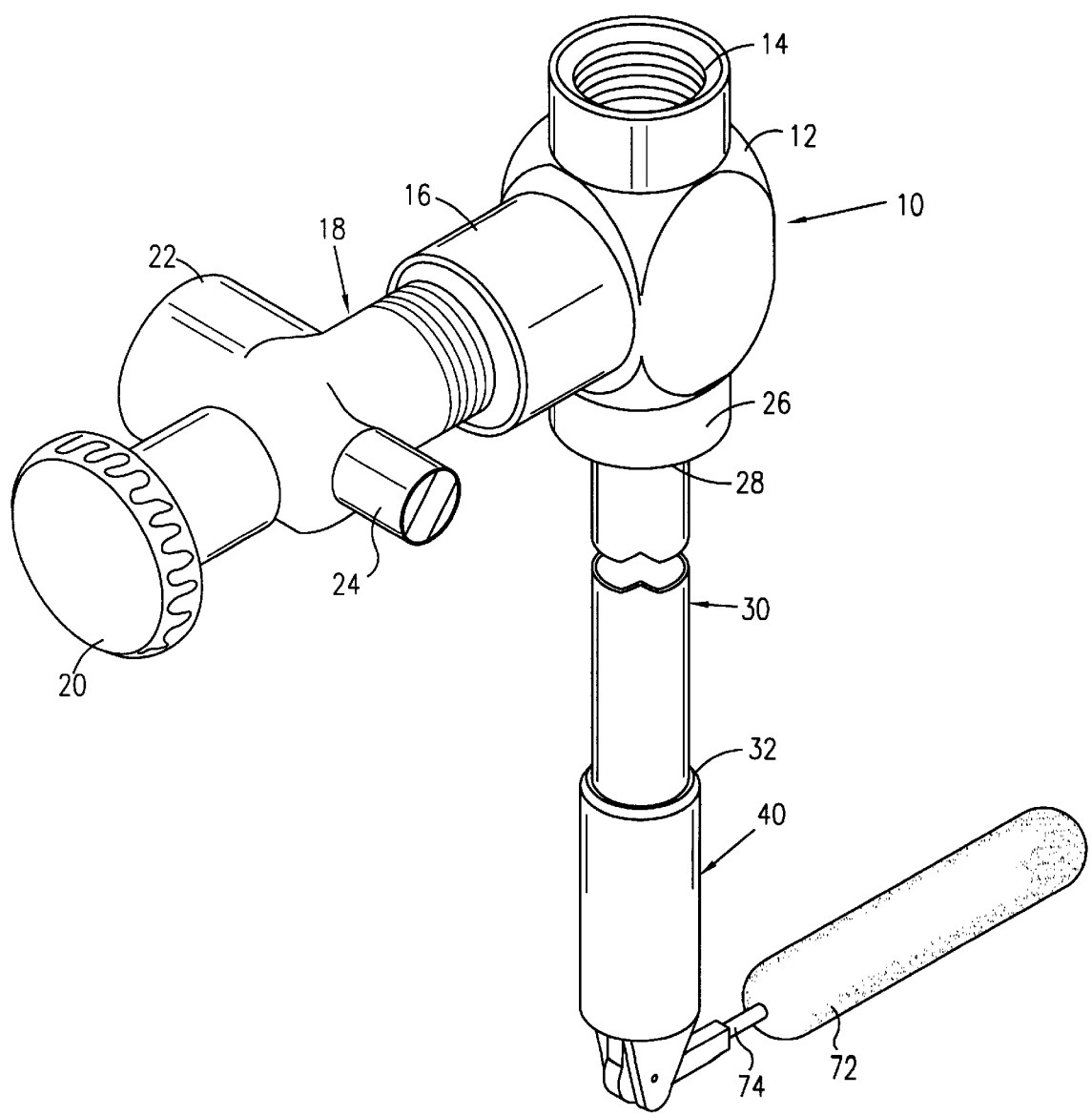
FIG. 1 is a simplified pictorial illustration of filling apparatus constructed and operative in accordance with a preferred embodiment of the present invention.

Reference is now made to FIG. 1 which illustrates filling apparatus 10, constructed and operative in accordance with a preferred embodiment of the present invention.

Filling apparatus 10 preferably includes a tee 12 which includes a first threaded branch 14 for attachment thereat to a source of pressurized fluid (not shown), such as pressurized LPG. A second threaded branch 16 is preferably attached to a consumer valve 18. Valve 18 preferably includes a handle 20 for closing/opening, thereof, a threaded coupling 22 for attachment thereat to a consumer fluid supply line (not shown), and a relief valve 24. A third threaded branch 26 of tee 12 is preferably attached to an upper end 28 of a pipe 30. A lower end 32 of pipe 30 is preferably attached to and in fluid communication with a valve 40.

Figure 2:
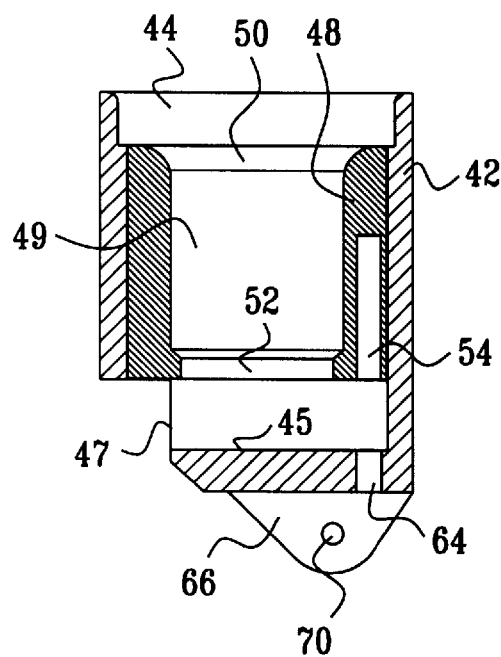
FIG. 2 is a simplified, partially sectional illustration of a valve of the filling apparatus of FIG. 1, constructed and operative in accordance with a preferred embodiment of the present invention, in an open position.
Figure 3:
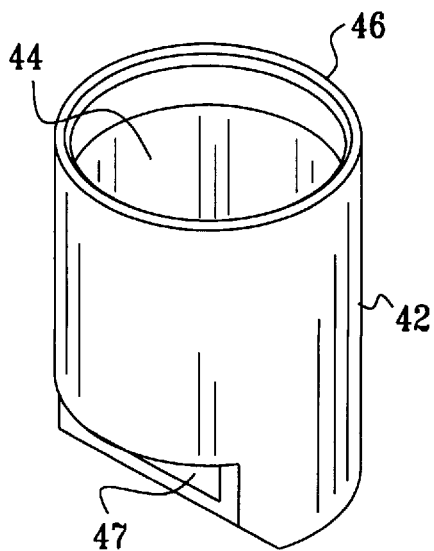
FIG. 3 is a simplified pictorial illustration of a tube of the valve of FIG. 2.
Figure 4:
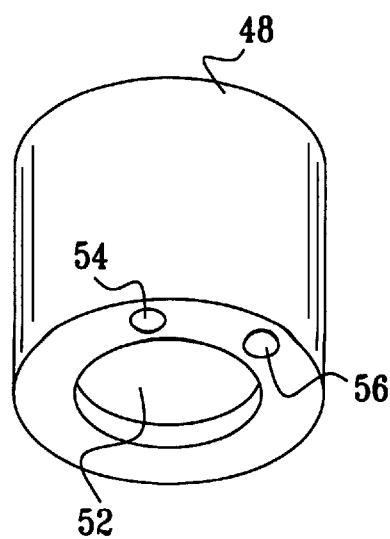
FIG. 4 is a simplified pictorial illustration of a piston of the valve of FIG. 2, the piston being slidingly disposed in the tube in FIG. 2.

Reference is now made to FIGS. 2–4 which illustrate valve 40, constructed and operative in accordance with a preferred embodiment of the present invention, in an open position. Valve 40 includes a tube 42 with a longitudinal bore 44 formed therein. Bore 44 preferably has a threaded end 46 which is threadably connected to lower end 32 of pipe 30 (FIG. 1). A relatively large side port 47 is formed in tube 42, generally flush with a bottom inner surface 45 of tube 42.

A piston 48, preferably generally cylindrical in shape, is slidingly disposed in tube 42. Piston 48 is preferably formed with a bore 49 whose upper end 50 is larger in diameter than its lower end 52. Piston 48 is preferably formed with two blind holes 54 and 56.

Figure 5:
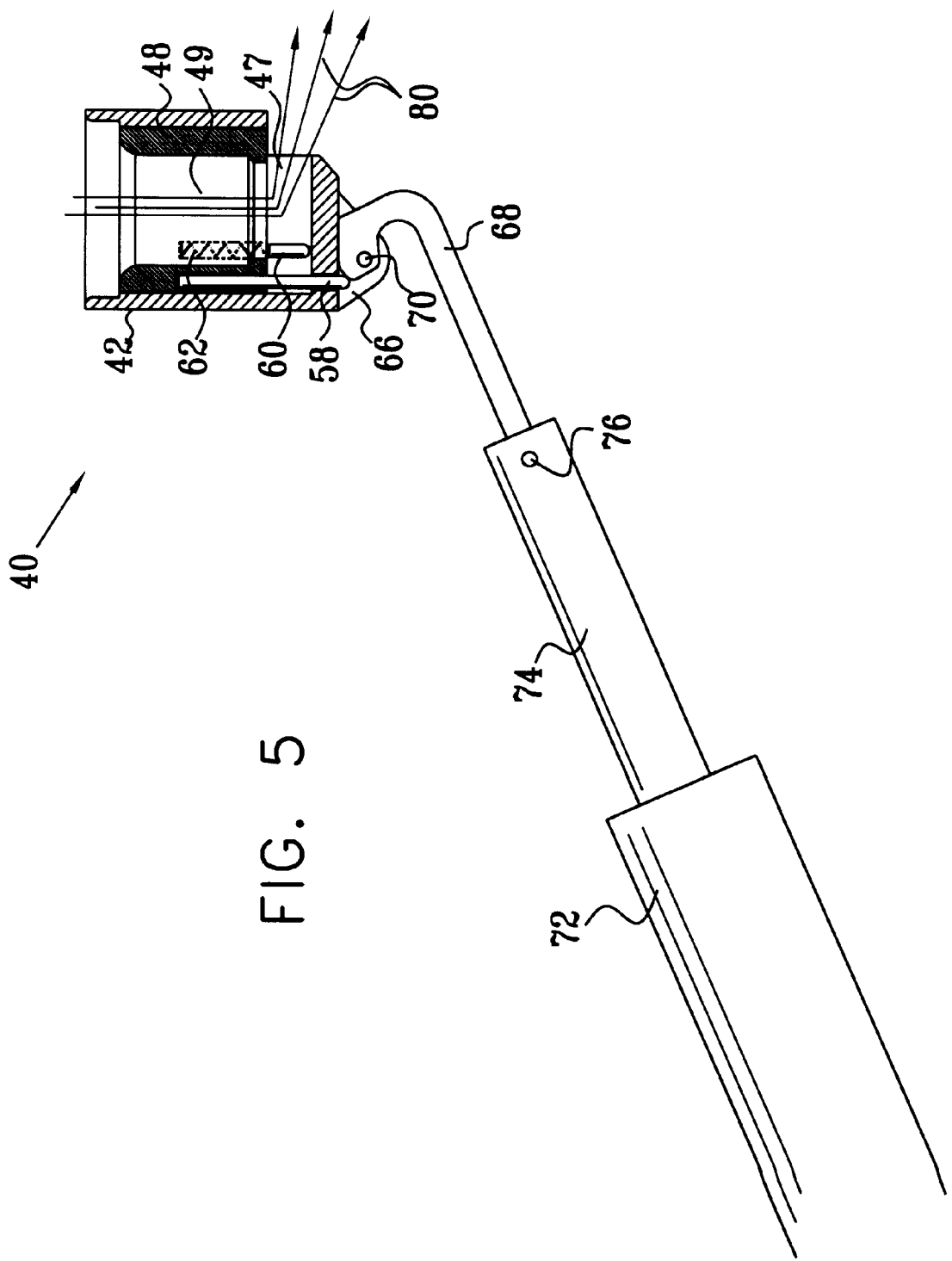
FIGS. 5 and 6 are simplified, partially sectional illustrations of the valve of FIG. 2, in open and closed positions, respectively.

Reference is now additionally made to FIG. 5. Piston 48 includes a jutting portion, preferably in the form of an elongate pin 58 fixedly mounted in hole 54. A driver pin 60, shorter than pin 58, is slidingly disposed in hole 56 and is preferably biased by a biasing device, such as a spring 62. (For the sake of clarity, pins 58 and 60 are not shown in FIG. 2.) Tube 42 is preferably formed with a hole 64 (FIG. 2) through which elongate pin 58 can slide.

Tube 42 is preferably provided with a lower extension 66. A valve lever 68 is preferably pivotally attached to lower extension 66 by means of a pin 70. A float 72 is mounted on a float arm 74 which is pivotally attached to valve lever 68 by means of a pin 76. This pinned connection is discussed more in detail further hereinbelow.

In the position shown in FIG. 5, valve 40 is open. Float 72 is positioned at a generally obtuse angle with respect to pipe 30 (FIG. 1) and to a longitudinal axis of tube 42. Elongate pin 58 is supported by the end of valve lever 68, and as such, piston 48 is raised and does not block side port 47 of valve 40. A pressurized fluid 80 may be introduced from a fluid source (not shown) and flow through first threaded branch 14 and pipe 30 (FIG. 1), and through side port 47 into a pressurized fluid container (not shown). As in U.S. Pat. No. 6,026,841, a bypass passageway (not shown) may be provided such that vapors of fluid 80 can be conducted through the bypass passageway even during filling of the container. In this way, a consumer can constantly use the fluid, such as for home cooking, without interruption, even during filling of container.

Figure 6:
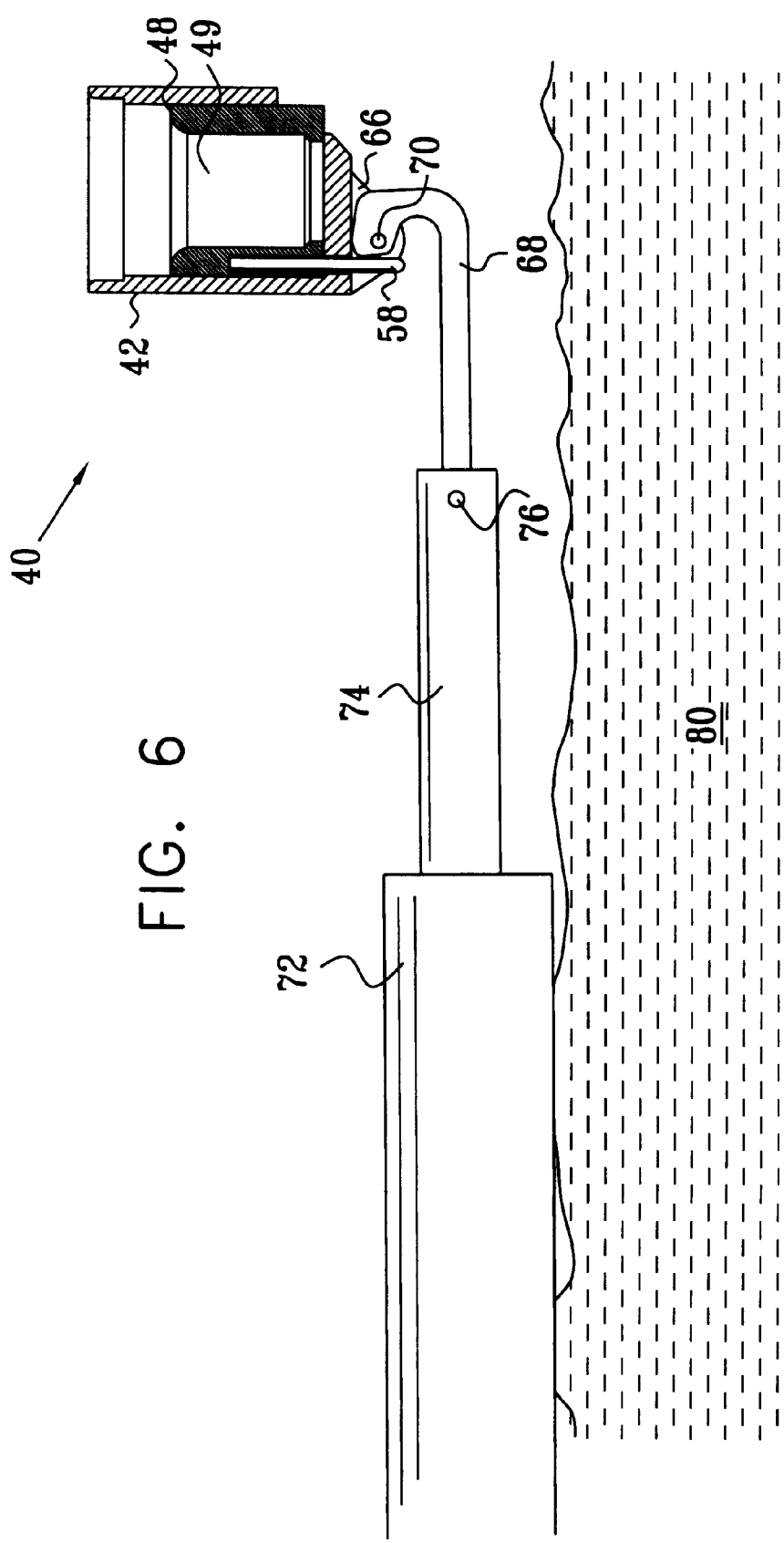

Reference is now made to FIG. 6 which illustrates the position of filling apparatus 10 upon further filling of the container with pressurized fluid 80. Upon sufficient filling of the container, float 72 is buoyed by fluid 80 which causes float arm 74 to swing upwards. Elongate pin 58 is no longer supported by the end of valve lever 68, and instead falls downwards along with piston 48. Piston 48 falls down to surface 45 of tube 42 and now blocks side port 47, thereby preventing pressurized fluid 80 from flowing through side port 47 into the container. Thus filling apparatus 10 automatically stops filling the container without any need for fluid to escape to the environment to signal when to stop filling the container.

As mentioned hereinabove, the diameter of upper end 50 is larger than that of lower end 52 of bore 49 of piston 48. The difference in diameters means that the pressure of pressurized fluid 80 flowing through bore 49 is greater at the top of piston 48 than at the bottom. This ensures that piston 48 is maintained against surface 45 as long as fluid 80 is flowing through valve 40. After flow has stopped, pressure equilibrium is eventually reached between the top and bottom of piston 48. It is noted that the difference in diameters can be adjusted in the design of filling apparatus 10 to achieve a desired pressure difference and thereby control the fluid flow.

Side port 47 provides two surprising advantages. First, a significantly greater flow rate of pressurized fluid 80 passes through valve 40, meaning that the container is filled faster than before. Second, the flow through side port 47 has significantly less turbulence than the bottom exit of U.S. Pat. No. 6,026,841. This is due, inter alia, to the fact that side port 47 is located on the side of tube 42 opposite to float 72 and float arm 74, and the flow does not impinge upon float 72 or float arm 74. Thus, in the present invention, a faster filling rate is achieved with significantly reduced turbulence.

As mentioned hereinabove, after flow of fluid 80 has stopped, pressure equilibrium is eventually reached between the top and bottom of piston 48. The consumer draws upon fluid 80 from the container. Gradually the level of fluid 80 in the container goes down, and float arm 74 swings downwards. Spring 62 urges piston 48 upwards, thereby opening side port 47 in order to permit further filling of the container, if desired.

Figure 7:
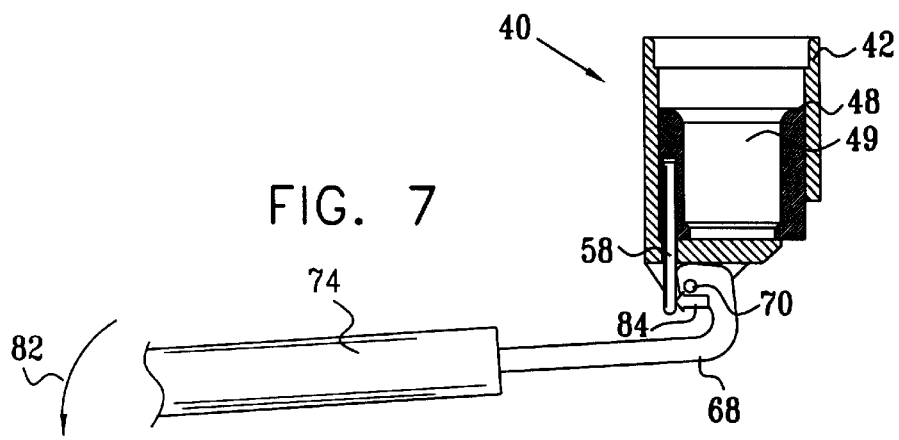
FIG. 7 is a simplified, partially sectional illustration of the valve of FIG. 2 with a float arm rigidly attached to a valve lever of the valve.

Reference is now made to FIG. 7. If float arm 74 were rigidly connected to valve lever 68, as float arm 74 swings down (about pin 70) in the direction of an arrow 82, valve lever 68 pushes against pin 58. The force of valve lever 68 against pin 58 works against the upward bias of spring 62, and may possibly interfere with the upward movement of piston 48.

Figure 8:
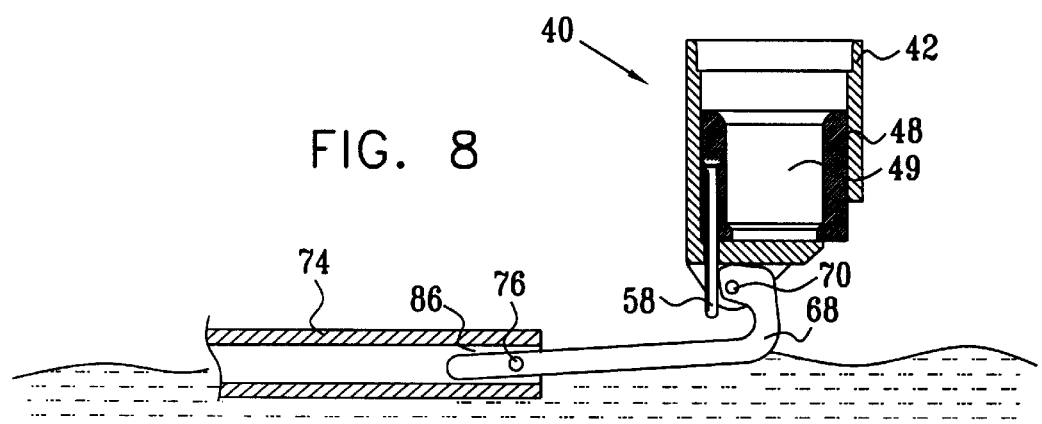
FIGS. 8 and 9 are simplified, partially sectional illustrations of the valve of FIG. 2 with the float arm pivotally attached to the valve lever, in accordance with a preferred embodiment of the present invention, respectively in closed and open positions.
Figure 9:
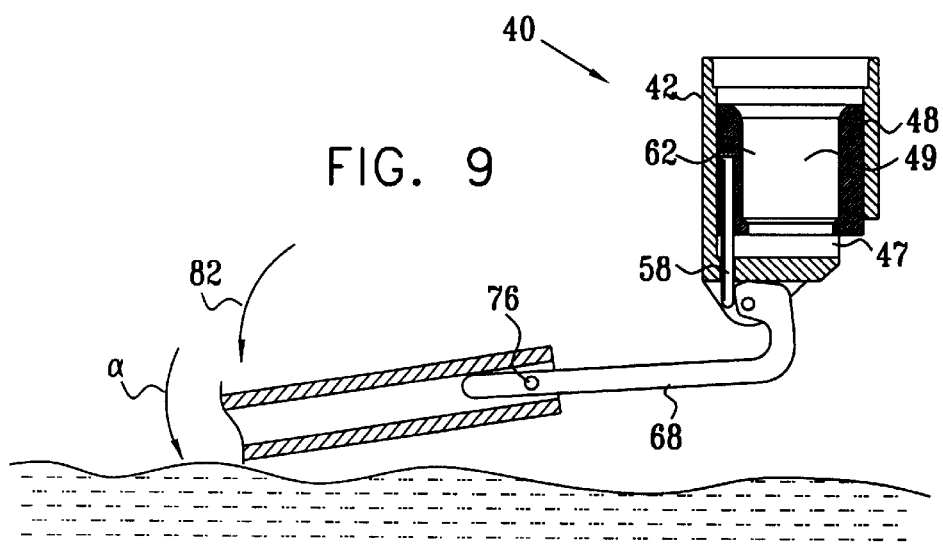

However, as described hereinabove, float arm 74 is not rigidly connected to valve lever 68, but rather is pivotally connected to valve lever 68 about pin 76. Referring to FIG. 8, it is further seen that there is a clearance 86 between an internal perimeter of float arm 74 and valve lever 68. As seen in FIG. 9, because of clearance 86, float arm 74 can rotate about pin 76 through an angle α (in the direction of arrow 82) without causing any motion of valve lever 68. (The clearance 86 moves from above valve lever 68 to below valve lever 68 from FIG. 8 to FIG. 9.) This means that there is a delay in valve lever 68 moving, and valve lever 68 does not push against pin 58. During this delay, spring 62 urges piston 48 upwards in the absence of any sideways force of valve lever 68 against pin 58. Thus, spring 62 freely urges piston 48 upwards and thereby opens side port 47.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A filling valve for a pressurized fluid container, comprising:
    a tube with a longitudinal bore and a side port formed therein;
    a piston slidingly disposed in said tube, said piston being formed with a bore therethrough;
    a pin fixedly attached to the piston and extending generally parallel to said longitudinal bore downwardly of said piston and extending there below;
    a valve lever pivotally attached to a portion of said tube and defining a cam comprising a jutting portion;
    a float arm attached to said valve lever; and
    a float mounted on said float arm, wherein when a liquid in said pressurized fluid container is below a predetermined level within said container and said float is not positioned generally perpendicular to a longitudinal axis of said tube, said pin is engaged, raised and supported by said cam of said valve lever, such that said piston is raised and does not block said side port, thereby permitting fluid flow through said side port, and wherein when said liquid in said pressurized fluid. container is at least at said predetermined level within said. container and said float is sufficiently buoyed by a fluid, said float arm swings upwards to a position generally perpendicular to said longitudinal axis of said tube, said pin is no longer engaged and supported by said jutting portion of said cam of said valve lever and said piston moves downwards and blocks said side port, thereby preventing fluid flow through said side port.

2. The valve according to claim 1 wherein said side port is located on a side of said tube opposite to said float and said float arm.

3. The valve according to claim 1 wherein said jutting portion comprises an elongate pin fixedly attached to said piston.

4. The valve according to claim 1 wherein said piston is biased by a biasing device, which applies a force against said piston in a direction generally towards an upper portion of said tube.

5. The valve according to claim 1 wherein an upper end of said bore of said piston is larger in diameter than a lower end thereof.

6. The valve according to claim 1 wherein said float arm is pivotally attached to said valve lever.

7. The valve according to claim 6 wherein said float arm and said valve lever are configured such that there is a clearance between an internal perimeter of said float arm and said valve lever, wherein because of said clearance, said float arm is rotatable through an angle with respect to said valve lever without causing motion of said valve lever.

8. The valve according to claim 1 and also comprising a spring loaded driver pin assembly mounted onto said piston arranged to bias said piston into a raised position in the absence of differential pressure thereon.

\* \* \* \* \*